April 20, 1965     R. H. DUNHAM     3,179,429

CONTRACTING COLLET

Filed Nov. 23, 1962

INVENTOR
RUSSELL H. DUNHAM

BY Mandeville & Schweitzer
ATTORNEYS

United States Patent Office 3,179,429
Patented Apr. 20, 1965

3,179,429
CONTRACTING COLLET
Russell H. Dunham, New Fairfield, Conn., assignor to The Dunham Tool Company, Inc., New Fairfield, Conn., a corporation of Connecticut
Filed Nov. 23, 1962, Ser. No. 239,609
3 Claims. (Cl. 279—50)

The present invention relates to work-holding devices for turning machines, and more particularly to a new and improved contractible collet for externally chucking a workpiece.

Conventional contractible collets are normally contracted by an inward axial movement of the collet against a taper in the face of a turning machine. The axial movement of the conventional collet during contraction is also imparted to the held workpiece. That is to say, the workpiece, too, will be drawn toward the turning machine by the collet as it is contracted and drawn into the face of the machine by a conventional draw tube. It has been found in many of the applications where external chucking is practicable, that the movement of the workpiece, caused by the axial movement of the contractible collet, is, in fact, most undesirable, seriously reducing the accuracies attainable.

It is an object of the present invention to provide an external work-holding device capable of high repeat accuracy. Another object of the invention is to provide a combination of a contractible collet and contracting means therefor, in which the collet, itself, is maintained in a fixed axial position with respect to the face of a turning machine while the contracting means is axially movable relative thereto. A further important object is to provide a contractable collet which may be contracted without any axial movement of the collet, itself, which collet may be used with conventional turning equipment without any modification thereto.

In accordance with the present invention, a slotted collet, having contractible jaws at its outer end, is fixedly mounted at its inner end to a turning machine. Advantageously, the outer external peripheral edges of the collet jaws are convergently tapered, and a longitudinal bore extends the entire length of the collet, defining a workpiece receptacle at the outer end. The collet jaws are contracted to clamp a workpiece therebetween by means of a new and improved "draw-in" contractor comprising a contracting ring which encircles the jaws at the outer end of the collet. In accordance with the invention, the contracting ring is tapered at its outer end to engage the taper on the collet jaws. The contracting ring is carried by a longitudinal actuating rod and is supported internally by a series of flat spokes extending radially from the rod. The spokes are narrower than the collet slots and are geometrically arranged so as to be insertable into and movable through the collet slots toward the inner end of the collet.

With the spokes aligned in the collet slots, the actuating rod is projected through the collet to bring the contracting ring into close proximity to the externally tapered jaws. The actuating rod may then be connected to a conventional draw tube of the turning machine by means of an adapter plug, while the collet itself is fixedly mounted at its inner end to the face of the turning machine. Thus, when the draw tube is drawn away from the collet, the shaft will draw the internally supported ring axially toward the inner end of the fixed collet, causing the contracting ring to coact with the external collet taper to urge the collet jaws to contract.

Advantageously, a guide screw is fastened to the innermost end of the collet and adapted to mate with a socket in the adapter plug to insure that the adapter plug, once adjusted, is maintained non-rotatable with respect to the actuating shaft.

For greater and more complete understanding of the nature of the present invention, reference should be made to the following detailed description taken in conjunction with the accompanying drawing, in which.

Figure 1:
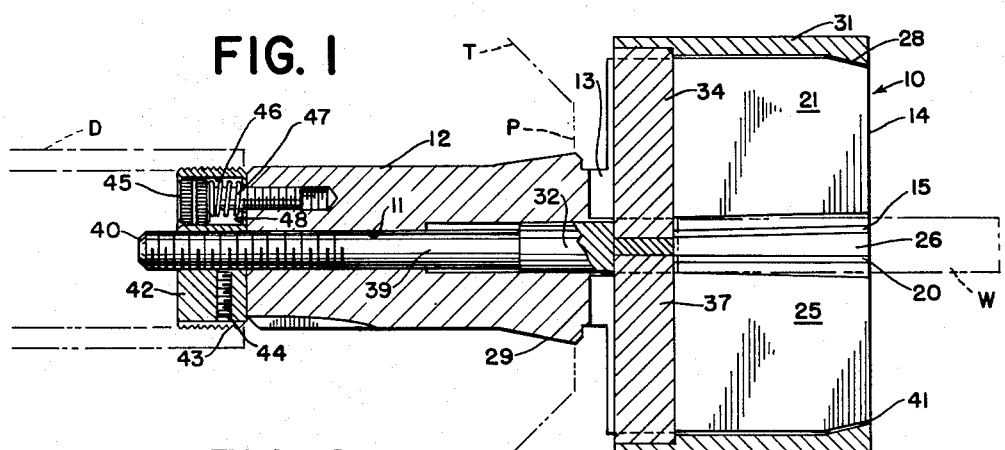
FIG. 1 is a cross-sectional view of a collet and contractor combination embodying the principles of the present invention with the collet jaws in an uncontracted condition.
Figure 3:
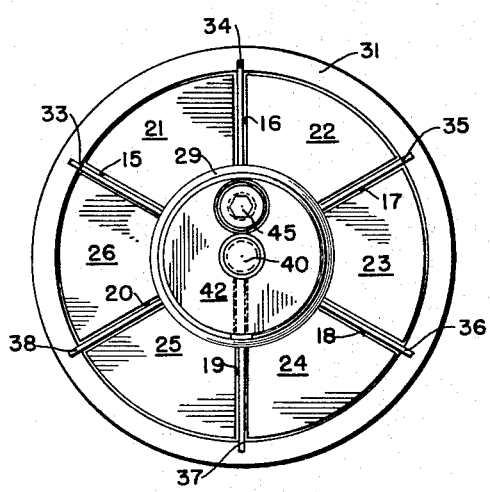
FIG. 3 is an end view of the mechanism of FIG. 1.

With reference to FIG. 1, a contractible collet is indicated generally at 10 and has a longtudinal bore 11 extending from an inner end 12 through a neck 13 to an outer end 14. The collet outer end 14 defines a plurality of equiangularly disposed slots 15–20, best illustrated in FIG. 3, which communicate with the bore 11 from a series of jaws 21–26 having convergently tapered peripheral edges 28. Advantageously, the inner end 12 has a divergently tapered portion 29, which is adapted to be seated firmly in the spindle face of a conventional turning machine T defining a reference plane P and having a draw tube D (shown in outline).

In accordance with the invention, the slotted collet 10 is fabricated from a readily machinable material such as soft steel. Thus, the size and shape of the bore 11 at the outer end 14 of the collet may easily be modified by a machinist to meet special chucking requirements. For example, the bore 11 can be milled out to accommodate specially-designed or odd-shaped parts or a shoulder may be formed in the bore 11 to form a stop against which a workpiece may be banked.

Figure 4:
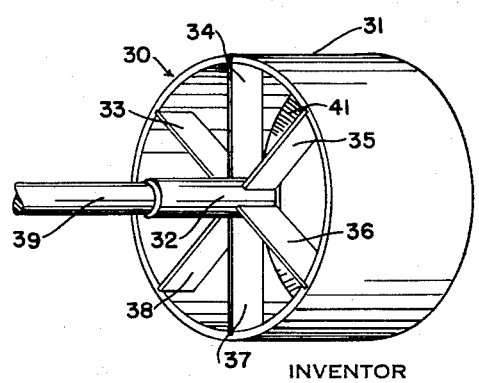
FIG. 4 is a perspective view of the contractor element incorporated in the collet of FIG. 1.

The contractor of the present invention may be a ring-like element and is indicated generally by the reference numeral 30. As clearly illustrated in perspective in FIG. 4, the contractor 30 comprises a contracting ring 31 mounted at its inner end to the enlarged end 32 of an actuating rod 39, by a series of equiangularly disposed spokes 33–38. The rod 39 is threaded at its inner end 40, as indicated in FIGS. 1 and 2.

The outer end 41 of the ring 31 is of reduced diameter and is convergently tapered. In accordance with the invention a rearward axial movement of the tapered surface 41 over the tapered external surface 28 of the fixed collet 10 causes related contraction of the collet jaws 21–26.

Figure 2:
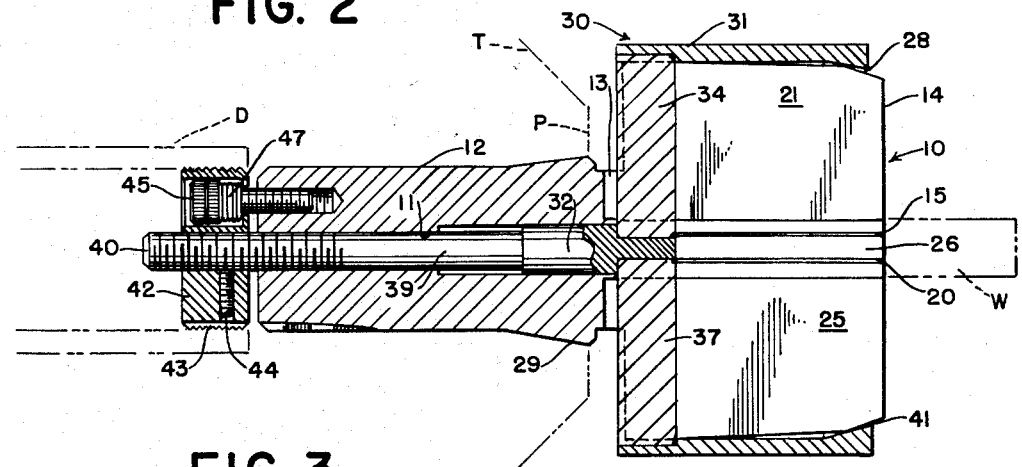
FIG. 2 is a cross-sectional view of the mechanism of FIG. 1 with the collet jaws in a contracted condition.

As shown in FIGS. 1 and 2, the rearward actuating motion necessary to contract the collet jaws about a workpiece W is imparted to the contracting ring 31 from within the collet itself. This is accomplished by supporting the ring internally by a series of slat-like spokes 33–38 having widths less than the widths of slots 15–20. Thus the contracting ring 31 may be placed over the collet 10 with the spokes 33–38 actually projecting radially into the slots 15–20. In this fashion, actuating motion is transmitted from the actuating rod 39, within the collet, to the contracting ring 31, without the collet, by means of the slat-like spokes 33–38.

The actuating rod 39 has the necessary motion imparted thereto by the draw tube D forming a conventional part of the turning machine. To that end, an adapter plug 42 is provided to connect the aforementioned two elements, the plug 42 being provided with external threads 43 with which it is fastened securely to the draw tube D. The plug also is internally threaded for adjustable connection to the threaded inner end 40 of the actuating rod 39. The connection of the adapter plug to actuating rod is made fast and is prevented from loosening by a set screw 44. Thus it will be understood that axial movement of the draw tube will move the contractor 30 inwardly and outwardly relative to the collet 10 which is fixed to the face of the turning machine.

The adapter 42 is kept non-rotatable with respect to the collet 10 by a guide screw 45 threaded into the inner end 12 of the collet 10. A biasing coil spring 47 acts between the underside of the head of guide screw 45 and the base 48 of the socket 46 to urge the collet 10 rearwardly even when the draw tube is in its forward position, so that the coil spring 47 seats the external collet taper 29 in the spindle of the turning machine T.

The new and improved work-holding mechanism disclosed herein has great utility in external chucking applications where it is desirous and beneficial to maintain a workpiece axially immovable with respect to a contracting collet. The new and improved collet combination is especially adapted to be used with conventional turning machines without any modification thereto. Thus it is seen that the invention provides an effective and new means of externally chucking a workpiece with a unique collet combination that may be simply installed on existing turning machines.

Although the present invention has been described with reference to a specific, preferred embodiment, it should be understood that the disclosure has been made only by way of example and that certain changes in details of construction and arrangement of elements may be made without departing from the spirit and the scope of the invention as hereinafter claimed.

I claim:
1. In combination, a work-holding device comprising
   (a) a contractible collet having an inner end portion and an outer end portion,
   (b) said collet defining a longitudinal bore extending therethrough and diverging at said outer end to form a workpiece receptacle,
   (c) said outer end defining a plurality of radial slots of a predetermined first width communicating with said bore, said slots disposed in a predetermined angular relationship,
   (d) a plurality of contractible jaws being formed between said slots,
   (e) said jaws having a convergent taper at outer peripheral edges thereof,
   (f) said collet adapted to be maintained axially with respect to a reference plane,
   (g) a rigid ring-like contractor element having an internal surface adapted to act against said convergent taper,
   (h) a longitudinal actuating rod extending through said bore, and
   (i) a plurality of spoke means disposed in said predetermined angular relationship and mounting said ring to said actuating rod,
   (j) said ring-like contractor element being axially movable relative to said collet and thereby being reciprocable relative to said reference plane,
   (k) whereby said ring-like contractor element urges said collet jaws to contract when said ring-like element is moved toward said reference plane.

2. A draw bar actuated work-holding device for a turning machine having a rotating spindle and an actuating draw bar, comprising
   (a) a collet having an inner portion, adapted to be received and seated in said spindle in fixed axial relation thereto, and an outer portion adapted to project forward of said spindle,
   (b) said outer portion having a plurality of radial slots forming contractible collet jaws,
   (c) a contracting ring received in surrounding relation to said collet jaws,
   (d) said ring and said jaws having cooperating convergently tapered surfaces whereby said jaws are urged radially inward upon axial movement of said ring toward the inner portion of said collet,
   (e) an actuating rod received internally of said collet,
   (f) spoke-like elements extending radially through said collet and connecting said actuating rod with said ring, and
   (g) means for connecting the inner end of said actuating rod to the draw bar of said turning machine.

3. A work holding device comprising
   (a) a collet adapted to be mounted in a fixed axial relationship with a predetermined reference plane and having a plurality of resilient, contractible jaws,
   (b) said collet jaws generally defining an internal chamber having a predetermined geometrical configuration embracive of a workpiece to be held,
   (c) said collet jaws having an external peripheral convergent taper,
   (d) said collet jaws defining radial slots therebetween extending into said chamber,
   (e) a rigid ring-like contractor element adapted to telescope and to engage said convergent taper to contract said jaws,
   (f) axially movable actuator means disposed partially within said collet body for reciprocal movement relative to said reference plane, and
   (g) radial spoke means extending from said internally disposed actuator means through the radial slots between the collet jaws to said external contractor element and supporting said contractor element for telescoping, collet actuating movement,
   (h) whereby selective displacement of said actuator means toward and away from said reference plane will respectively effect the contraction and accommodate the expansion of said jaws.

References Cited by the Examiner

UNITED STATES PATENTS

| | | | |
|---|---|---|---|
| 2,337,471 | 12/43 | Hines | 279—49 |
| 2,415,482 | 2/47 | Greenough | 279—50 |
| 2,683,042 | 7/54 | Bender | 297—50 |
| 2,742,296 | 4/56 | Satterlee | 279—2 |
| 2,769,643 | 11/56 | Denzler | 279—50 |
| 2,966,361 | 12/60 | Phillips | 279—2 |
| 2,993,418 | 7/61 | Doane | 279—42 |

FRANK SUSKO, *Primary Examiner.*
ROBERT C. RIORDON, *Examiner.*